US 9,040,866 B2

(12) United States Patent
Tanaka (10) Patent No.: US 9,040,866 B2
(45) Date of Patent: May 26, 2015

(54) SPOT WELDING APPARATUS

(75) Inventor: Atsushi Tanaka, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 383 days.

(21) Appl. No.: 13/555,036

(22) Filed: Jul. 20, 2012

(65) Prior Publication Data

US 2013/0037525 A1 Feb. 14, 2013

(30) Foreign Application Priority Data

Aug. 9, 2011 (JP) ................................. 2011-173571

(51) Int. Cl.
B23K 11/11 (2006.01)
B23K 11/31 (2006.01)

(52) U.S. Cl.
CPC ............. B23K 11/115 (2013.01); B23K 11/315 (2013.01); B23K 11/317 (2013.01)

(58) Field of Classification Search
CPC ............. B23K 11/0033; B23K 22/115; B23K 11/241; B23K 11/3009; B23K 11/314; B23K 11/315; B23K 11/317; B23K 11/318; B23K 2201/18
USPC .................................... 219/86.1, 86.25, 86.33
See application file for complete search history.

(56) References Cited

U.S. PATENT DOCUMENTS

| | | | | |
|---|---|---|---|---|
| 4,861,959 A | * | 8/1989 | Cecil | 219/86.41 |
| 6,313,427 B1 | * | 11/2001 | Suita | 219/86.41 |
| 6,337,456 B1 | * | 1/2002 | Taniguchi et al. | 219/86.25 |
| 2004/0134888 A1 | * | 7/2004 | Garza et al. | 219/86.25 |
| 2004/0208031 A1 | * | 10/2004 | Miwa et al. | 363/141 |
| 2007/0119822 A1 | * | 5/2007 | Schmitt-Walter | 219/86.33 |
| 2007/0199556 A1 | * | 8/2007 | Murai et al. | 126/20 |
| 2011/0192829 A1 | * | 8/2011 | Matsumoto et al. | 219/136 |
| 2012/0241416 A1 | * | 9/2012 | Sakamoto | 219/86.1 |

FOREIGN PATENT DOCUMENTS

| | | |
|---|---|---|
| JP | H09-085453 A | 3/1997 |
| JP | 2002-263847 A | 9/2002 |
| JP | 2003-251469 A | 9/2003 |
| JP | 2005-088069 A | 4/2005 |

(Continued)

OTHER PUBLICATIONS machine translation of Japan Patent No. 2008-119,754, Oct. 2014.*

(Continued)

*Primary Examiner* — Geoffrey S Evans
(74) *Attorney, Agent, or Firm* — McGinn IP Law Group, PLLC (57) ABSTRACT

There is provided a spot welding apparatus. The spot welding apparatus includes a pressing force actuator that causes a movable electrode to move to a pressing force applying position where the movable electrode applies a pressing force to a workpiece together with a fixed electrode, a control pressing force applying actuator that causes a receiving unit to move to a control pressing force applying position where the receiving unit is located adjacent to the fixed electrode and comes into contact with the workpiece so as to apply a control pressing force, and a welding transformer. The control pressing force applying actuator and the welding transformer are linearly aligned at a rear side of the pressing force actuator that is arranged at a front side of a support bracket.

13 Claims, 6 Drawing Sheets

(56) References Cited

FOREIGN PATENT DOCUMENTS

| JP | 2007-268567 A | | 10/2007 |
|----|---------------|---|---------|
| JP | 2008-119754 A | * | 5/2008 |
| JP | 2011-011259 A | | 1/2011 |
| JP | 2012-055924 A | | 3/2012 |

OTHER PUBLICATIONS

Notification of Reason(s) for Refusal dated Jun. 11, 2013.
English translation of Japanese Office Action dated Jun. 11, 2013.

* cited by examiner

SPOT WELDING APPARATUS

CROSS-REFERENCE TO RELATED APPLICATIONS

The present application claims priority from Japanese Patent Application No. 2011-173571 filed on Aug. 9, 2011, the entire contents of which are hereby incorporated by reference.

BACKGROUND OF THE INVENTION

1. Field of the Invention

The present invention relates to a spot welding apparatus that spot-welds a workpiece in the form of a plate assembly including stacked plates of different rigidities.

2. Description of the Related Art

Generally, a spot welding technique is widely used for joining stacked plates, such as steel plates. The spot welding technique involves using a pair of, welding electrodes to hold and apply a pressing force to the stacked plates, and applying a current between the welding electrodes for a predetermined time period.

Figure 5A:
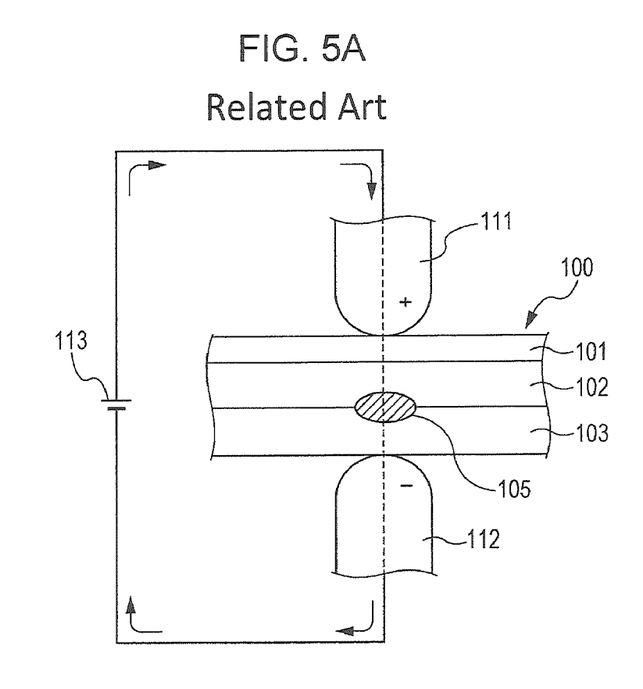
FIGS. 5A and 5B are diagrams schematically illustrating a spot welding process according to related art.

Referring to FIG. 5A, when spot-welding a workpiece 100 in the form of a plate assembly including three stacked plates, i.e., a thin plate 101 having a lower rigidity, and a first thick plate 102 and a second thick plate 103 having a higher rigidity than the thin plate 101, a movable electrode 111 and a fixed electrode 112 hold the workplace 100 therebetween such that the thin plate 101 is in tight contact with the first thick plate 102, and that the first thick plate 102 is in tight contact with the second thick plate 103. Then, when a power source 113 applies a current to the workpiece 100 via the movable electrode 111 and the fixed electrode 112, the current density in an electric path between the movable electrode 111 and the fixed electrode 112 becomes substantially uniform. Thus, a good nugget is formed that extends from the thin plate 101 to the second thick plate 103, thereby achieving the required weld strength.

In actuality, however, when the workpiece 100 is held and pressed between the movable electrode 111 and the fixed electrode 112, the thin plate 101 having a lower rigidity and the first thick plate 102 bend upward, causing gaps to form between the thin plate 101 and the first thick plate 102 as well as between the first thick plate 102 and the second thick plate 103.

In this case, the contact area between the movable electrode 111 and the thin plate 101 is increased due to the bending of the thin plate 101, whereas the contact area of the joint section between the thin plate 101 and the first thick plate 102 and the contact area of the joint section between the first thick plate 102 and the second thick plate 103 are reduced due to the gaps. Therefore, the current density between the movable electrode 111 and the fixed electrode 112 at the second thick plate 103 side becomes higher than that at the thin plate 101 side. This results in a greater local calorific value between the first thick plate 102 and the second thick plate 103 than between the thin plate 101 and the first thick plate 102.

Figure 5B:
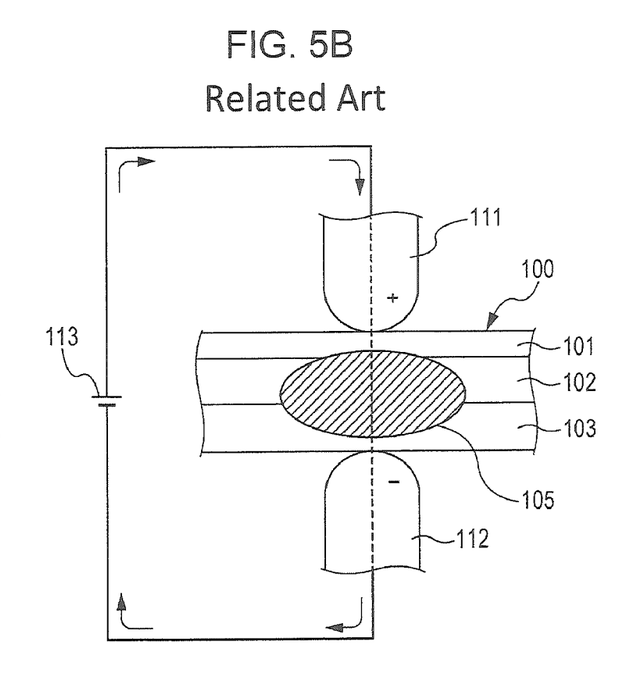

As a result, as shown in FIG. 5A, a nugget 105 is first formed at the joint section between the first thick plate 102 and the second thick plate 103. Then, as shown in FIG. 5B, the nugget 105 gradually grows so that the thin plate 101 and the first thick plate 102 are ultimately welded to each other. However, because the amount of weld penetration between the thin plate 101 and the first thick plate 102 is small, the weld strength is poor. Thus, the thin plate 101 may be separated from the first thick plate 102, and the welding quality varies. This problem becomes prominent particularly when the thickness of the first thick plate 102 and the thickness of the second thick plate 103 are increased since the increased thicknesses make it difficult for the nugget 105 to reach the joint section between the first thick plate 102 and the thin plate 101.

Figure 6:
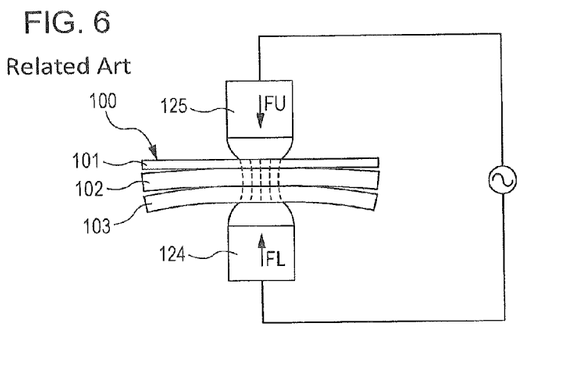
FIG. 6 is a diagram schematically illustrating a spot welding process according to related art.

Japanese Unexamined Patent Application Publication No. 2003-251469 discloses an example of a spot welding method as a countermeasure against this problem. Specifically, as shown in FIG. 6, when spot-welding the workpiece 100 formed of three stacked plates, i.e., the thin plate 101, the first thick plate 102, and the second thick plate 103, a pressing force FU of a movable electrode 125 at the thin plate 101 side is set to be lower than a pressing force FL of a fixed electrode 124 at the second thick plate 103 side. Thus, the contact resistance between the thin plate 101 and the first thick plate 102 is increased, whereas the contact resistance between the first thick plate 102 and the second thick plate 103 is reduced. Accordingly, when a current is applied between the movable electrode 125 and the fixed electrode 124, the calorific value at the joint section between the thin plate 101 and the first thick plate 102 is increased, thereby increasing the weld strength between the thin plate 101 and the first thick plate 102.

Figure 7:
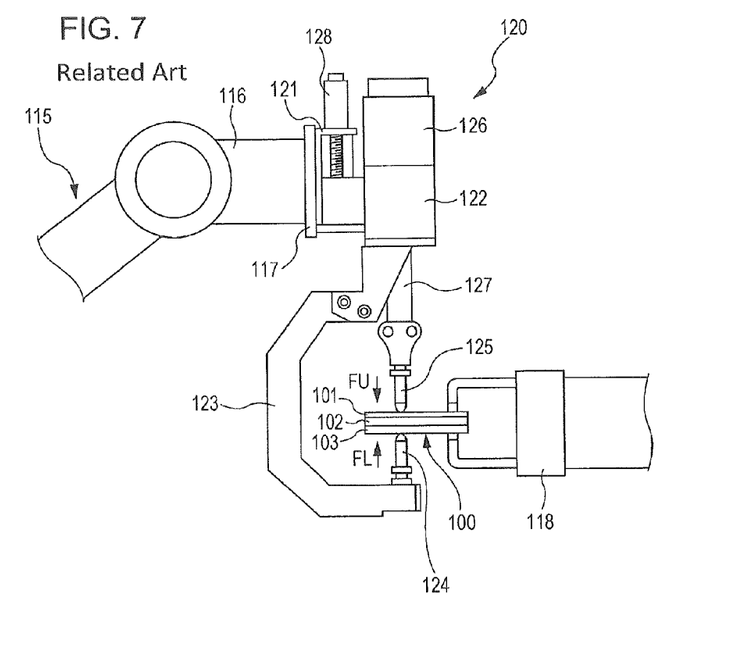
FIG. 7 is a diagram schematically illustrating a spot welding process according to related art.

FIG. 7 illustrates the configuration of a spot welding apparatus used for implementing this method. Specifically, a spot welding apparatus 120 is attached to a wrist 116 of a welding robot 115. The welding robot 115 moves the spot welding apparatus 120 to each spot position of the workpiece 100 supported by a clamper 118 and spot-welds the workpiece 100.

The spot welding apparatus 120 includes a base 122 that is vertically movably supported by a linear guide 121. The linear guide 121 is fixed to a support bracket 117 attached to the wrist 116. A fixed arm 123 extending downward is provided on the base 122. The fixed electrode 124 is provided at a distal end of the fixed arm 123.

A pressing force actuator 126 is attached to an upper end of the base 122 and is configured to move a rod 127 vertically. The movable electrode 125 is attached to a lower end of the rod 127 so as to face the fixed electrode 124. A servomotor 128 is attached to an upper end of the support bracket 117. The servomotor 128 is configured to move the base 122 vertically by means of a ball screw mechanism.

In accordance with teaching data stored in advance in a controller (not shown), the controller first causes the servomotor 128 to move the base 122 upward so as to bring the fixed electrode 124 into contact with a lower surface of the workpiece 100, and causes the pressing force actuator 126 to move the movable electrode 125 downward so as to bring the movable electrode 125 into contact with an upper surface of the workpiece 100. In this case, the pressing force of the pressing force actuator 126 is uniformly applied to the movable electrode 125 and the fixed electrode 124 via the base 122 and the fixed arm 123.

Subsequently, the base 122 is moved upward by the servomotor 128. When the base 122 is moved upward, the pressing force FL of the fixed electrode 124 increases by an amount corresponding to the distance of the upward movement of the base 122, whereby the pressing force FU of the movable electrode 125 becomes lower than the pressing force FL of the fixed electrode 124 (FU<FL).

As a result, when a current is applied between the movable electrode 125 and the fixed electrode 124, the current density at the joint section between the thin plate 101 and the first thick plate 102 becomes high, causing the calorific value to become relatively higher than the calorific value at the joint section between the first thick plate 102 and the second thick plate 103. Consequently, a good uniform nugget is formed that extends from the thin plate 101 to the second thick plate 103, thereby ensuring a high weld strength.

According to the above Japanese Unexamined Patent Application Publication No. 2003-251469, the fixed electrode 124 is brought into contact with the second thick plate 103 of the workpiece 100 clamped by the clamper 118, and the movable electrode 125 is brought into contact with the thin plate 101. Further, the pressing force FU of the movable electrode 125 is set to be lower than the pressing force FL of the fixed electrode 124 by moving the base 122 upward. Then, the current density between the thin plate 101 and the first thick plate 102 becomes relatively higher. Thus, a sufficient calorific value can be obtained at the joint section between the thin plate 101 and the first thick plate 102, thereby achieving an increased amount of weld penetration and increased weld strength.

However, when setting the pressing force FU of the movable electrode 125 to be lower than the pressing force FL of the fixed electrode 124 by moving the base 122 while the workpiece 100 is clamped by the clamper 118 and is held and pressed between the fixed electrode 124 and the movable electrode 125, a large load is placed on the clamper 118 clamping the workpiece 100. On the other hand, if the clamped position of the workpiece 100 clamped by the clamper 118 and the welding position of the workpiece 100 are markedly distant from each other, the workpiece 100 deforms and bends. This causes the pressing force FL of the fixed electrode 124 and the pressing force FU of the movable electrode 125 to vary, making it difficult to obtain stable contact resistance between the thin plate 101 and the first thick plate 102 and stable contact resistance between the first thick plate 102 and the second thick plate 103. This may result in variations in the current density at the joint sections, leading to reduced spot welding quality.

Figure 8:
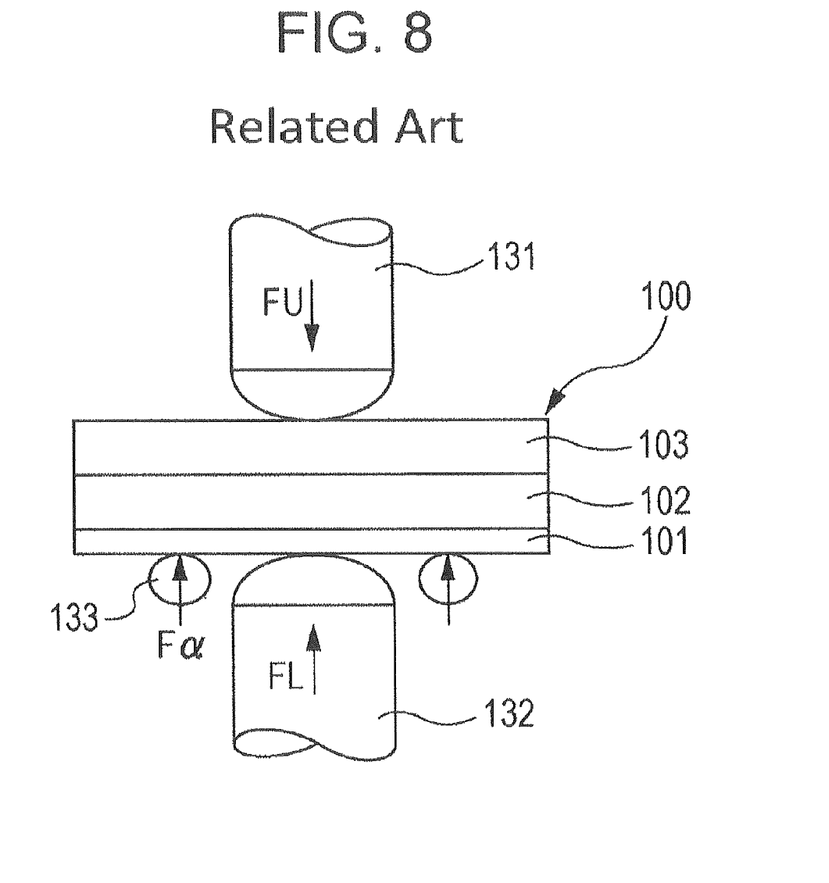
FIG. 8 is a diagram schematically illustrating a spot welding apparatus.

In order to solve such problems, the applicant of the present patent application has proposed, in Japanese Patent Application No. 2010-200643, a spot welding apparatus schematically shown in FIG. 8. This spot welding apparatus holds and presses a weld section of a workpiece 100, and causes a control pressing force applying actuator (not shown) to press a control pressing force applying unit 133 against a thin plate 101 of the workpiece 100 and thereby apply a control pressing force Fα to the workpiece 100 such that a pressing force FL of a fixed electrode 132 applied to a thin plate 101 side is controlled to be lower than a pressing force FU of a movable electrode 131 applied to a second thick plate 103 side (FL<FU). Then, the spot welding apparatus applies a current between the movable electrode 131 and the fixed electrode 132 for a predetermined time period and thereby performs welding.

The control pressing force applying actuator is disposed in the vicinity of the movable electrode 131. Therefore, the dimension of this spot welding apparatus in a width direction thereof is greater than that of an ordinary spot welding apparatus, and the size of the spot welding apparatus is increased. Moreover, the surrounding space of the movable electrode 131 and the fixed electrode 132, i.e., the operating space, is limited, which might affect welding operations of a welding robot.

SUMMARY OF THE INVENTION

Accordingly, it is an object of the present invention to provide a spot welding apparatus that can achieve high workability and high welding quality when spot-welding a workpiece in the form of a plate assembly including stacked plates of different rigidities.

According to an aspect of the present invention, there is provided a spot welding apparatus including a first welding electrode; a pressing force actuator that causes a second welding electrode facing the first welding electrode to move between a pressing force applying position, where the second welding electrode holds a workpiece together with the first welding electrode such that the first welding electrode and the second welding electrode apply pressing forces to the workpiece, and a retracted position away from the workpiece; a control pressing force applying actuator that causes a control pressing force applying unit to move between a control pressing force applying position, where the control pressing force applying unit is located adjacent to the first welding electrode or the second welding electrode and comes into contact with the workpiece so as to apply a control pressing force to the workpiece, and a retracted position away from the workpiece; a welding transformer serving as a power source that applies a current between the first welding electrode and the second welding electrode; and a support bracket supported by a welding robot; wherein the pressing force actuator is arranged at a front side of the support bracket, while the control pressing force applying actuator and the welding transformer are linearly arranged at a rear side of the pressing force actuator. According to the above aspect, since the control pressing force applying actuator causes the control pressing force applying unit to apply the control pressing force to the workpiece to which the pressing forces of the first welding electrode and the second pressing electrode have been applied, the pressing forces of the first welding electrode and the second welding electrode are controlled. This improves the welding quality of the workpiece formed of stacked plates of different rigidities.

Further, since the pressing force is arranged at the front side of the support bracket supported by the welding robot, and the control pressing force applying actuator and the welding transformer are linearly arranged at the rear side of the pressing force actuator, the dimension of the spot welding apparatus in the width direction is reduced, which allows the spot welding apparatus to be reduced in size. In addition, since the space in front and on both sides of the first welding electrode and the second welding electrode is open, an operating space can easily be reserved. Accordingly, the area of the workpiece that can be welded by the spot welding apparatus is increased, and thus the welding quality and the workability are improved.

In the spot welding apparatus described above, the support bracket may include a base unit supported by the welding robot, and a pair of sides facing each other and extending from the base. Further, the pressing force actuator may be disposed on distal ends of the sides with a bracket interposed therebetween, and the control pressing force applying actuator and the welding transformer may be disposed between the sides.

According to the configuration described above, the pressing force actuator, the control pressing force applying actuator, and the welding transformer can reliably held by the support bracket supported by the welding robot.

In the spot welding apparatus described above, the control pressing force applying actuator may include a servomotor composed of a hollow motor, and a linear motion unit having a ball screw attached to an end of a hollow rotor and a rod screwed onto the ball screw. Further, a control pressing force applying arm having the control pressing force applying unit may be connected to the rod.

According to the configuration described above, since the control pressing force applying actuator includes a servomotor composed of a hollow motor, and a liner motion unit having a ball screw attached to an end of a hollow rotor and a rod screwed onto the ball screw, the size of the control pressing force applying actuator can be reduced, which makes it easy to reduce the size of the spot welding apparatus.

According to an embodiment of the present invention, since the control pressing force applying actuator causes the control pressing force applying unit to apply the control pressing force to the workpiece to which the pressing forces of the first welding electrode and the second pressing electrode have been applied, the pressing forces of the first welding electrode and the second welding electrode are controlled. This improves the welding quality of the workpiece formed of stacked plates of different rigidities.

Further, since the pressing force is arranged at the front side of the support bracket supported by the welding robot, and the control pressing force applying actuator and the welding transformer are linearly arranged at the rear side of the pressing force actuator, the dimension of the spot welding apparatus in the width direction is reduced, which allows the spot welding apparatus to be reduced in size. In addition, since the space in front and on both sides of the first welding electrode and the second welding electrode is open, an operating space can be reserved. Accordingly, the area of the workpiece that can be welded by the spot welding apparatus is increased, and thus the welding quality and the workability are improved.

DESCRIPTION OF THE PREFERRED EMBODIMENTS

Figure 1:
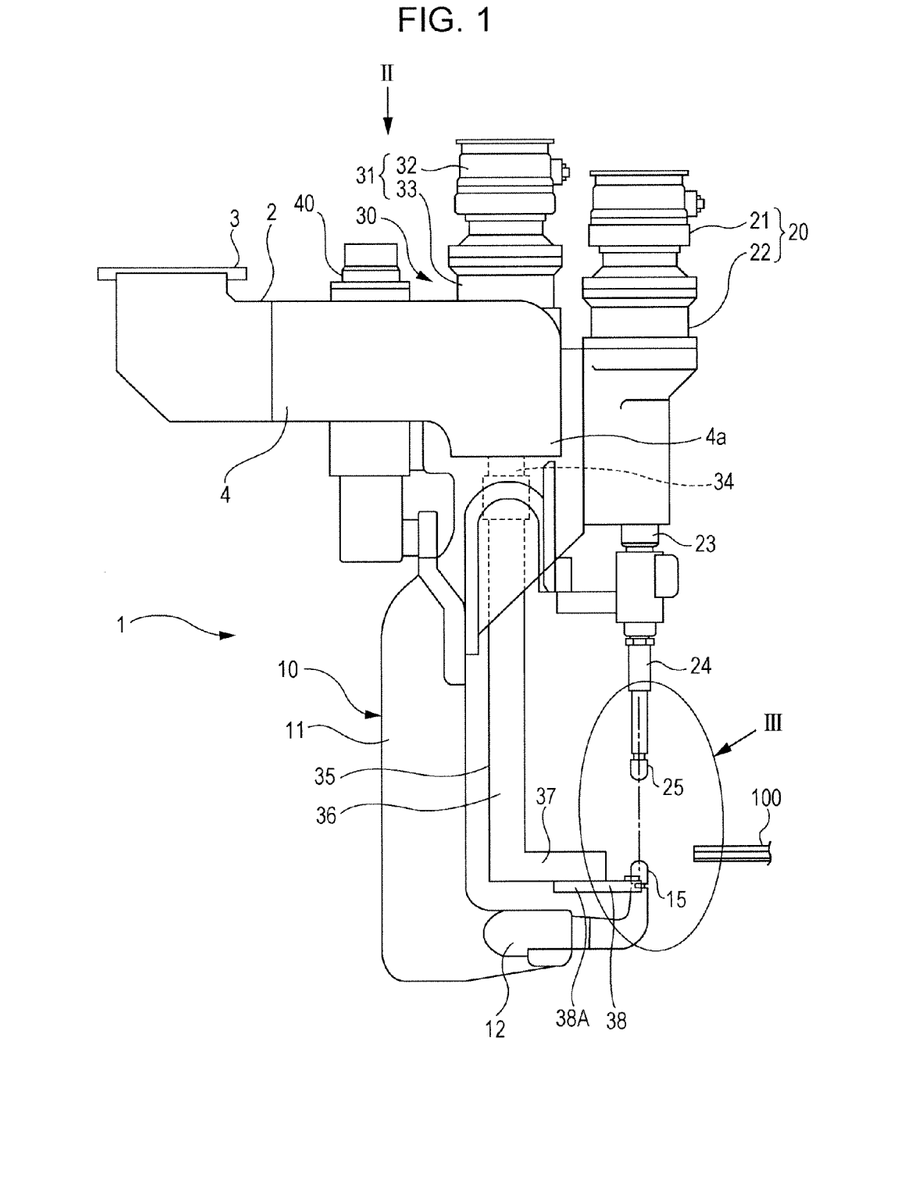
FIG. 1 is a diagram illustrating the configuration of a spot welding apparatus according to an embodiment.
Figure 2:
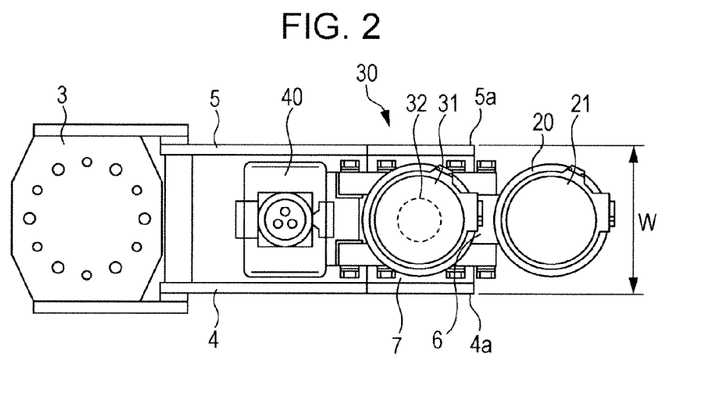
FIG. 2 is a view taken in the direction of the arrow II in FIG. 1.
Figure 3:
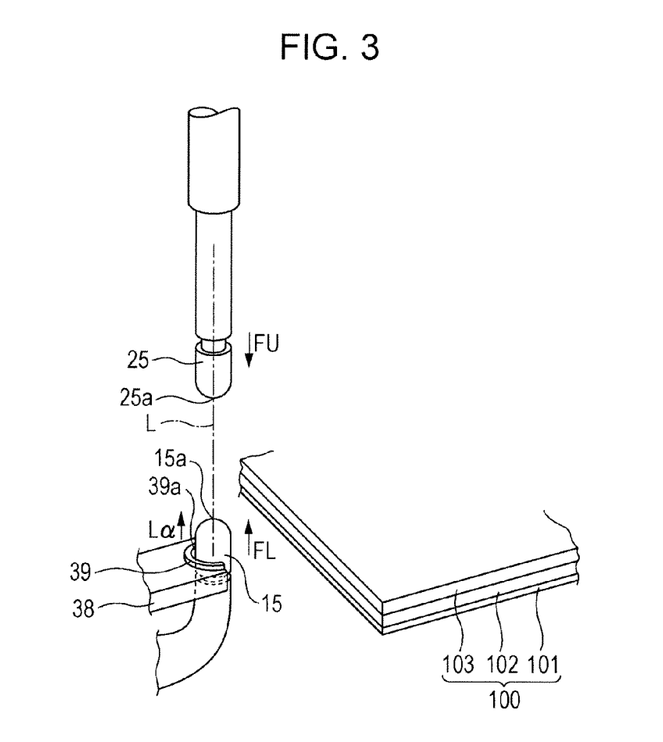
FIG. 3 is an enlarged view illustrating a part indicated by III in FIG. 1.
Figure 4A:
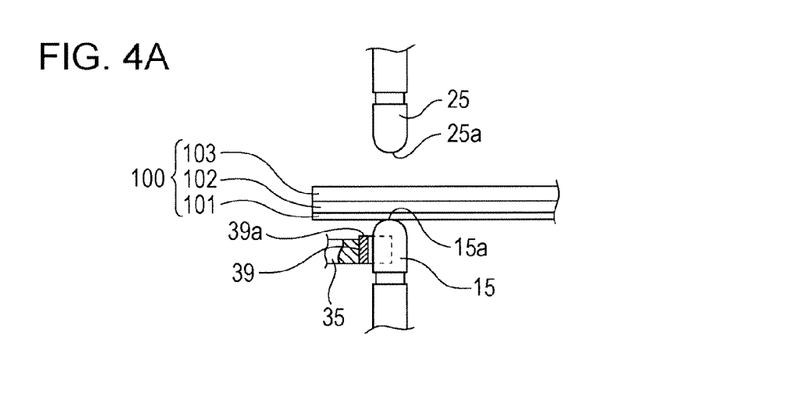
FIGS. 4A through 4C are schematic operational diagrams.
Figure 4B:
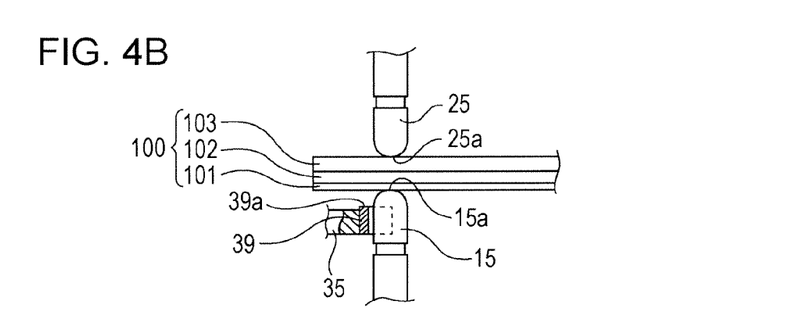
Figure 4C:
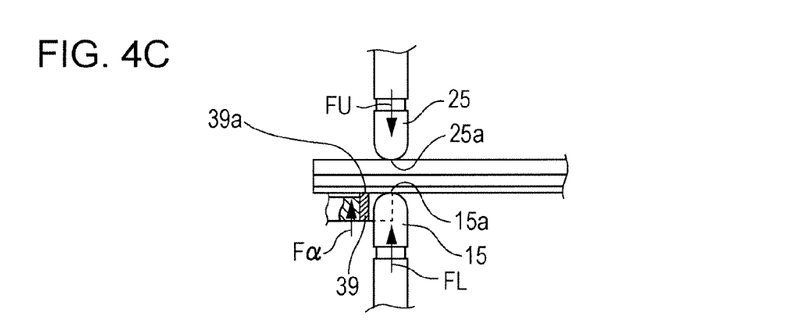

An embodiment of the present invention will be described with reference to FIGS. 1 through 4C. FIG. 1 is a diagram illustrating the configuration of a spot welding apparatus 1. FIG. 2 is a view taken in the direction of the arrow II in FIG. 1. FIG. 3 is an enlarged view illustrating a part indicated by III in FIG. 1. FIGS. 4A through 4C are schematic operational diagrams.

Before describing the spot welding apparatus 1, a workpiece 100 will be described first. Referring to FIG. 3, the workpiece 100 is a three-plate assembly formed by stacking a thin plate over one of two stacked thick plates. More specifically, the workpiece 100 includes a thin plate 101 having a lower rigidity, and a first thick plate 102 and a second thick plate 103 having a greater thickness and a higher rigidity than the thin plate 101. The thin plate 101, the first thick plate 102, and the second thick plate 103 are stacked in this order from the bottom.

The spot welding apparatus 1 includes a substantially rectangular base 3 attached to a wrist of a welding robot (not shown) with an equalizer unit interposed therebetween, and a support bracket 2 having sides 4 and 5 facing each other and extending horizontally from the opposite sides of the base portion 3. A fixed arm 10 is attached to the opposing sides 4 and 5 of the support bracket 2. A bracket 6 is attached to distal ends 4a and 5a of the sides 4 and 5. A pressing force actuator 20 is attached to a front side of the support bracket 2 with the bracket 6 interposed therebetween. Further, a control pressing force applying actuator 31 of a control pressing force applicator 30 is disposed between the distal ends 4a and 5a of the opposite sides 4 and 5. A welding transformer 40 is attached and supported between substantially centers of the sides 4 and 5. The pressing force actuator 20, the control pressing force applying actuator 31, and the welding transformer 40 are arranged as shown in FIG. 2. More specifically, the pressing force actuator 20 is arranged at the front side of the support bracket 2, while the control pressing force applying actuator 31 and the welding transformer 40 are linearly arranged, between the sides 4 and 5, at a rear side of the pressing force actuator 20. The control pressing force applying actuator 31 and the welding transformer 40 are held between the opposite sides 4 and 5 and thereby reliably held by the support bracket 2. The pressing force actuator 20 is connected to the support bracket 2 with the bracket 6.

The fixed arm 10 includes a fixed arm main body 11 extending downward and having a base end connected to the opposite sides 4 and 5 of the support bracket 2, and an electrode holding unit 12 extending forward from a distal end of the fixed arm main body 11 and bent so as to have an L shape. A fixed electrode 15 serving as a first welding electrode is attached, with a tip end 15a facing upward, to the electrode holding unit 12.

The pressing force actuator 20 includes a servomotor 21 composed of a hollow motor having a hollow rotor which is rotatably accommodated in a motor housing. The pressing force actuator 20 further includes a linear motion unit 22, which has a ball screw attached to an end of the hollow rotor and a rod 23 screwed onto the ball screw. The rod 23 of the linear motion unit 22 is vertically reciprocated by the servomotor 21. Since the servomotor 21 is composed of a hollow motor and since the servomotor 21 and the linear motion unit 22 are coaxially aligned with each other, the pressing force actuator 20 is formed in a cylindrical shape with a relatively small diameter.

An electrode arm 24 is provided at a lower end of the rod 23 of the linear motion unit 22. A movable electrode 25 serving as a second welding electrode is provided at a distal end of the electrode arm 24. The movable electrode 25 is coaxially aligned with the fixed electrode 15 provided on the fixed arm 10, i.e., is arranged on a central axis L, so as to face the fixed electrode 15. The servomotor 21, the linear motion unit 22, the electrode arm 24, and the movable electrode 25 are arranged on the central axis L.

Thus, the movable electrode 25 is moved by the servomotor 21 of the pressing force actuator 20 along the central axis L between a retracted position defined as an upper movement end which is located above and away from the fixed electrode 15 and a pressing force applying position where the movable electrode 25 holds the workpiece 100 together with the fixed electrode 15 such that the fixed electrode 15 and the movable electrode 25 apply pressing forces to the workpiece 100. The pressing forces applied to the workpiece 100 by the fixed electrode 15 and the movable electrode 25, i.e., a pressing force FL of the fixed electrode 15 and a pressing force FU of the movable electrode 25, are dependent on the rotational torque of the servomotor 21. Accordingly, pressing forces of a desired magnitude can be obtained by controlling the rotational torque of the servomotor 21.

The control pressing force applicator 30 includes a control pressing force applying actuator 31 held between the opposite sides 4 and 5 of the support bracket 2 by a support member 7, and a control pressing force applying arm 35 having a distal end at which a receiving unit 39 is provided. The control pressing force applying actuator 31 includes a servomotor 32 composed of a hollow motor having a hollow rotor which is rotatably accommodated in a motor housing. The control pressing force applying actuator 31 further includes a linear motion unit 33, which has a ball screw attached to an end of the hollow rotor and a rod 34 screwed onto the ball screw. The rod 34 of the linear motion unit 33 is vertically reciprocated by the servomotor 32. A control pressing force applying arm 35 is attached to the rod 34 of the linear motion unit 33.

Since the servomotor 32 is composed of a hollow motor and since the servomotor 32 and the linear motion unit 33 are coaxially aligned with each other, the control pressing force applying actuator 31 is formed in a cylindrical shape with a relatively small diameter. Accordingly, the size of the control pressing force applying actuator 31 can be reduced, which makes it easy to reduce the size of the spot welding apparatus 1. The servomotor 32, the linear motion unit 33, and the control pressing force applying arm 35 are arranged on an axis parallel to the central axis L.

The control pressing force applying arm 35 includes an arm 36 and a movable receiving unit 38. The arm 36 has a base end connected to a distal end of the rod 34, is coaxially aligned with the rod 34, extends downward between the fixed arm 10 and the electrode arm 24, and has a distal end portion 37 defining a distal end of the arm 36 and bent toward the central axis L. The movable receiving unit 38 is connected to the distal end portion 37 of the arm 36, extends toward the central axis L, and has a distal end at which the receiving unit 39 serving as a pressing force applying unit is provided.

The movable receiving unit 38 is a rectangular plate that has a base end 38A connected to the distal end portion 37 of the arm 36 and that extends toward the direction of the central axis L. The receiving unit 39 is provided at a distal end of the movable receiving unit 38. The receiving unit 39 is coaxially aligned with the central axis L, has a distal end 39a projecting upward, and has a semicircular cross-sectional shape, i.e., a semi-cylindrical shape that allows the fixed electrode 15 to extend therethrough. The servomotor 32, the linear motion unit 33, and the control pressing force applying arm 35 of the control pressing force applicator 30 are arranged on an axis parallel to the central axis L.

The control pressing force applying arm 35 having the configuration described above is moved by the servomotor 32 along the central axis L between a retracted position which is away from the workpiece 100 and where the distal end 39a of the receiving unit 39 provided at the distal end of the control pressing force applying arm 35 is located below the tip end 15a of the fixed electrode 15 and a control pressing force applying position where the distal end 39a comes into contact from below with the workpiece 100 held between the fixed electrode 15 and the movable electrode 25 and applies a control pressing force Fα to the workpiece 100. This control pressing force Fα is dependent on the rotational torque of the servomotor 32. Accordingly, the control pressing force Fα of a desired magnitude can be obtained by controlling the rotational torque of the servomotor 32.

The welding transformer 40 serving as the power source has an output terminal electrically connected to the fixed electrode 15 through a bus bar, the fixed arm 10, etc., and the other output terminal electrically connected to the movable electrode 25 through a bus bar, the electrode arm 24, etc.

Further, a welding-robot controller (not shown) stores teaching data for the welding robot. The teaching data contains an operation program for sequentially spot-welding the welding spots of the workpiece 100, and information on the position and attitude of the spot welding apparatus 1 at each welding spot, i.e., at each welding position. A welding controller (not shown) stores an operation program for the spot welding apparatus 1 and controls operations of the pressing force actuator 20, the control pressing force applicator 30, and the welding transformer 40.

In the spot welding apparatus 1 having the configuration described above, the pressing force actuator 20 is arranged at the front side of the support bracket 2, which is attached to the wrist of the welding robot with the equalizer unit interposed therebetween, while the control pressing force applying actuator 31 and the welding transformer 40 are linearly arranged, at the rear side of the pressing force actuator 20, in this order from the distal end side to the base 3 side between the sides 4 and 5 of the support bracket 2. Therefore, a dimension W in the width direction is reduced, which allows the spot welding apparatus 1 to be reduced in size. In addition, the space in front and on both sides of the fixed electrode 15 and the movable electrode 25 is open, i.e., a large area except the fixed arm 10 side is open, and can be reserved as an operating space.

Next, operations of the spot welding apparatus 1 will be described with reference to schematic operational diagrams of FIGS. 4A through 4C.

When spot-welding the workpiece 100 formed of three plates including the thin plate 101, the first thick plate 102, and the second thick plate 103 which are stacked in this order from the bottom, in accordance with a preset program, the movable electrode 25 is held at its retracted position away from the fixed electrode 15 and the receiving unit 39 of the control pressing force applicator 30 is held at its retracted position as shown in FIG. 1. Then, the robot controller actuates the welding robot so as to position the spot welding apparatus 1 such that the tip end 15a of the fixed electrode 15 comes into contact with a spot position, i.e., a welding position of the workpiece 100, as shown in FIG. 4A.

The spot welding apparatus 1 attached to the wrist of the welding robot with the equalizer unit interposed therebetween has a reduced dimension W in the width direction thereof. Further, since the space in front and on both sides of the fixed electrode 15 and the movable electrode 25 is open, an operating space can easily be reserved. Thus, the control pressing force applying arm 35 is prevented from coming into contact with the workpiece 100, allowing the spot welding apparatus 1 to be easily positioned such that the tip end 15a of the fixed electrode 15 comes into contact with a spot position. Also, control of the attitude of the spot welding apparatus 1 is simplified. Accordingly, the operation control of the welding robot is simplified, and therefore the workload on the welding robot is reduced.

As shown in FIG. 4A, when the spot welding apparatus 1 is positioned at the welding position, the tip end 15a of the fixed electrode 15 is in contact with the thin plate 101 of the workpiece 100 from below. On the other hand, a tip end 25a of the movable electrode 25 faces the second thick plate 103 with a gap therebetween, and the distal end 39a of the receiving unit 39 faces the thin plate 101 with a gap therebetween.

Subsequently, as shown in FIG. 4B, while having the fixed electrode 15 in contact with the thin plate 101 of the workpiece 100, the movable electrode 25 is moved by the servomotor 21 of the pressing force actuator 20 from the retracted position to the pressing force applying position, i.e., toward the fixed electrode 15, so as to be in contact with the second thick plate 103 from above. The servomotor 21 is further driven such that the torque reaches a predetermined level, whereby the movable electrode 25 is brought into pressure contact with the second thick plate 103. Thus, the pressing force of the pressing force actuator 20 is applied to the movable electrode 25 and the fixed electrode 15 via the fixed arm 10, whereby a weld section of the workpiece 100 is held and pressed between the movable electrode 25 and the fixed electrode 15.

Meanwhile, the rod 34 of the linear motion unit 33 is moved upward by the servomotor 32 of the control pressing force applicator 30, whereby the control pressing force applying arm 35 is moved such that the receiving unit 39 provided at the distal end of the movable receiving unit 38 moves from the retracted position to the control pressing force applying position where the distal end 39a is located adjacent to the fixed electrode 15 and comes into pressure contact with the thin plate 101 of the workpiece 100 from below. The servomotor 32 is further driven such that the torque reaches a predetermined level, whereby the receiving unit 39 is brought into pressure contact with the thin plate 101 so as to apply a control pressing force $F\alpha$ to the thin plate 101.

When the control pressing force $F\alpha$ is applied to the workpiece 100 from below by the receiving unit 39 located adjacent to the fixed electrode 15 while holding and pressing the workpiece 100 between the fixed electrode 15 and the movable electrode 25 in the manner described above, the pressing force FU of the movable electrode 25 is applied to the second thick plate 103 of the workpiece 100 from above, whereas the pressing force FL of the fixed electrode 15 and the control pressing force $F\alpha$ of the receiving unit 39 are applied next to each other to the thin plate 101, as shown in FIG. 4C.

In this case, as schematically shown in FIG. 4C, the pressing force of the pressing force actuator 20 is applied to the movable electrode 25 via the electrode arm 24, etc., and is also applied to the fixed electrode 15, facing the movable electrode 25, via the fixed arm 10. Meanwhile, an urging force of the servomotor 32 of the control pressing force applicator 30 is applied to the receiving unit 39 via the control pressing force applying arm 35, etc. The pressing force FU of the movable electrode 25 applied to the second thick plate 103 from above is equal to the sum of the pressing force FL of the fixed electrode 15 and the control pressing force $F\alpha$ of the receiving unit 39 that are applied to the thin plate 101 from below (FU=FL+$F\alpha$).

Consequently, the workpiece 100 is stably held with the pressing force FU of the movable electrode 25 that is applied to the second thick plate 103 from above, the pressing force FL of the fixed electrode 15 and the control pressing force $F\alpha$ of the receiving unit 39 that are applied to the thin plate 101 from below.

On the other hand, in the weld section of the workpiece 100, the pressing force FU is applied to the second thick plate 103 by the movable electrode 25, whereas the pressing force FL and the control pressing force $F\alpha$ are applied to the thin plate 101 by the fixed electrode 15 and the receiving unit 39, respectively. That is, the pressing force FL of the fixed electrode 15 applied to the thin plate 101 is equal to a pressing force obtained by subtracting the control pressing force $F\alpha$ of the receiving unit 39 from the pressing force FU of the movable electrode 25 (FL=FU−$F\alpha$).

When the pressing force FL of the fixed electrode 15 applied to the thin plate 101 side is set to be lower than the pressing force FU of the movable electrode 25 applied to the second thick plate 103 side (FL<FU) as described above, the contact pressure at the joint section between the thin plate 101 and the first thick plate 102 becomes less than the contact pressure at the joint section between the first thick plate 102 and the second thick plate 103. Consequently, the contact resistance between the thin plate 101 and the first thick plate 102 becomes relatively higher, whereas the contact resistance between the first thick plate 102 and the second thick plate 103 becomes relatively lower.

Subsequently, while the workpiece 100 is clamped and pressed between the movable electrode 25 and a combination of the fixed electrode 15 and the receiving unit 39 and while the pressing force FL of the fixed electrode 15 located at the thin plate 101 side is set to be lower than the pressing force FU of the movable electrode 25 located at the second thick plate 103 side, welding is performed by applying a current between the movable electrode 25 and the fixed electrode 15 from the welding transformer 40 for a predetermined time period.

When a current is applied between the movable electrode 25 and the fixed electrode 15, the contact resistance at the joint section between the thin plate 101 and the first thick plate 102 becomes relatively higher, making the current density greater, whereas the contact resistance between the first thick plate 102 and the second thick plate 103 remains small. Thus, the calorific value at the joint section between the thin plate 101 and the first thick plate 102 becomes relatively higher than the calorific value at the joint section between the first thick plate 102 and the second thick plate 103. Consequently, a good nugget is formed that extends from the thin plate 101 to the second thick plate 103 without a variation in the current density, thereby ensuring a high weld strength of the thin plate 101.

After completion of this welding process, the rod 34 the linear motion unit 33 is moved downward by the servomotor 32 of the control pressing force applicator 30, whereby the control pressing force applying arm 35 is moved such that the receiving unit 39 provided at the distal end of the movable receiving unit 38 moves from the control pressing force applying position, where the receiving unit 39 is in pressure contact with the workpiece 100, to the retracted position. Further, the movable electrode 25 is moved from the pressing force applying position to the retracted position by the servomotor 21 of the pressing force actuator 20 such that the workpiece 100 is released from being held by the fixed electrode 15 and the movable electrode 25.

Subsequently, the welding robot is operated in accordance with the operation program so as to cause the spot welding apparatus 1 to retract from the spot position of the workpiece 100 and move to the next spot position of the workpiece 100.

According to the present embodiment having the configuration described above, since the control pressing force of the control pressing force applying actuator 31 is applied to the workpiece 100 to which the pressing forces of the fixed electrode 15 and the movable electrode 25 have been applied, the pressing forces FL and FU of the fixed electrode 15 and the movable electrode 25 are controlled. This improves the welding quality of the workpiece 100 formed of stacked plates of different rigidities.

Further, since the pressing force actuator 20 is arranged at the front side of the support bracket 2, which is attached to the wrist of the welding robot with the equalizer unit interposed therebetween, and the control pressing force applying actuator 31 and the welding transformer 40 are linearly arranged at the rear side of the pressing force actuator 20, the dimension W of the spot welding apparatus 1 in the width direction is reduced, which allows the spot welding apparatus 1 to be reduced in size. In addition, since the space in front and on both sides of the fixed electrode 15 and the movable electrode 25 is open, operating space can easily be reserved. Accordingly, the area of the workpiece that can be welded by the spot welding apparatus 1 is increased, whereby the welding quality is improved.

Furthermore, since the spot welding apparatus 1 is reduced in size, and since the space in front and on both sides of the fixed electrode 15 and the movable electrode 25 is open and can be reserved as an operating space, control of the attitude of the spot welding apparatus 1 is facilitated. Accordingly, the operation control of the welding robot is simplified, and therefore the workload on the welding robot can be reduced. In the case where a plurality of welding robots are used, since the interference with other welding robots is reduced, the welding robot can be operated together with other welding robots, and therefore the workability can be improved.

It should be noted that the present invention is not limited to the foregoing embodiment, and various modifications may be made without departing from the scope of the present invention. For example, in the above embodiment, the pressing force actuator 20, the control pressing force applying actuator 31, and the welding transformer 40 are linearly arranged in this order from the front side. However, the welding transformer 40 and the control pressing force applying actuator 31 may be linearly arranged in this order at the rear side of the pressing force actuator 20.

Further, in the above embodiment, the control pressing force of the receiving unit 39 is applied in the same direction as the pressing force of the fixed electrode 15. However, the present invention is applicable to a spot welding apparatus that applies a control pressing force in the same direction as a pressing force of a movable electrode 25.

What is claimed is:

1. A spot welding apparatus comprising:
   a first welding electrode;
   a pressing force actuator for causing a second welding electrode facing the first welding electrode to move between a pressing force applying position, where the second welding electrode holds a workpiece together with the first welding electrode such that the first welding electrode and the second welding electrode apply pressing forces to the workpiece, and a retracted position away from the workpiece;
   a control pressing force applying actuator for causing a control pressing force applying unit to move between a control pressing force applying position, where the control pressing force applying unit is located adjacent to the first welding electrode or the second welding electrode and comes into contact with the workpiece so as to apply a control pressing force to the workpiece, and a retracted position away from the workpiece;
   a welding transformer serving as a power source to apply a current between the first welding electrode and the second welding electrode; and
   a support bracket supported by a welding robot;
   wherein the pressing force actuator is arranged at a front side of the support bracket, while the control pressing force applying actuator and the welding transformer are linearly arranged at a rear side of the pressing force actuator.

2. The spot welding apparatus according to claim 1,
   wherein the control pressing force applying actuator includes a servomotor comprising a hollow motor, and a linear motion unit having a ball screw attached to an end of a hollow rotor and a rod screwed onto the ball screw,
   wherein a control pressing force applying arm is attached to the rod, the control pressing force applying arm including:
   a distal end portion bent toward the first welding electrode and the second welding electrode; and
   a movable receiving unit connected to the distal end portion and extending toward the first welding electrode and the second welding electrode,
   wherein the control pressing force applying unit is connected to a distal end of the movable receiving unit.

3. The spot welding apparatus according to claim 1, wherein the control pressing force applying unit applies the control pressing force at the front side of the support bracket.

4. The spot welding apparatus according to claim 1, wherein the welding transformer, the control pressing force applying actuator, and the pressing force actuator are sequentially arranged from the rear side of the pressing force actuator to the front side of the support bracket.

5. The spot welding apparatus according to claim 1,
   wherein the control pressing force applying actuator includes a servomotor comprising a hollow motor, and a linear motion unit having a ball screw attached to an end of a hollow rotor and a rod screwed onto the ball screw; and
   wherein a control pressing force applying arm having the control pressing force applying unit is connected to the rod.

6. The spot welding apparatus according to claim 5, wherein the servomotor and the linear motion unit are coaxially aligned with each other.

7. The spot welding apparatus according to claim 5, wherein the control pressing force applying arm includes:
   a distal end portion bent toward the first welding electrode and the second welding electrode; and
   a movable receiving unit connected to the distal end portion and extending toward the first welding electrode and the second welding electrode.

8. The spot welding apparatus according to claim 1,
   wherein the support bracket includes a base supported by the welding robot, and a pair of sides facing each other and extending from the base;
   wherein the pressing force actuator is disposed on distal ends of the sides with a bracket interposed therebetween; and
   wherein the control pressing force applying actuator and the welding transformer are disposed between the sides.

9. The spot welding apparatus according to claim 8,
   wherein the control pressing force applying actuator includes a servomotor comprising a hollow motor, and a linear motion unit having a ball screw attached to an end of a hollow rotor and a rod screwed onto the ball screw,
   wherein a control pressing force applying arm is attached to the rod, the control pressing force applying arm including:
   a distal end portion bent toward the first welding electrode and the second welding electrode; and
   a movable receiving unit connected to the distal end portion and extending toward the first welding electrode and the second welding electrode,
   wherein the control pressing force applying unit is connected to a distal end of the movable receiving unit.

10. The spot welding apparatus according to claim 8, wherein the welding transformer is disposed between a center of the pair of sides.

11. The spot welding apparatus according to claim 8,
    wherein the control pressing force applying actuator includes a servomotor having a hollow motor, and a linear motion unit having a ball screw attached to an end of a hollow rotor and a rod screwed onto the ball screw; and wherein a control pressing force applying arm having the control pressing force applying unit is connected to the rod.

12. The spot welding apparatus according to claim 11, wherein the servomotor and the linear motion unit are coaxially aligned with each other.

13. The spot welding apparatus according to claim 11, wherein the control pressing force applying arm includes:
   a distal end portion bent toward the first welding electrode and the second welding electrode; and
   a movable receiving unit connected to the distal end portion and extending toward the first welding electrode and the second welding electrode.

* * * * *